(12) United States Patent
Langdon

(10) Patent No.: US 6,341,580 B1
(45) Date of Patent: Jan. 29, 2002

(54) NUCLEUS AND METHOD FOR PRODUCING HALF OR MABE PEARLS

(75) Inventor: Richard W. N. Langdon, Pacifica Seafoods Ltd, New Wharf, Kaikoura (NZ)

(73) Assignee: Richard W. N. Langdon, Kaikoura (NZ)

( * ) Notice: Subject to any disclaimer, the term of this patent is extended or adjusted under 35 U.S.C. 154(b) by 0 days.

(21) Appl. No.: 09/554,672

(22) PCT Filed: Nov. 17, 1998

(86) PCT No.: PCT/NZ98/00167

§ 371 Date: Jul. 10, 2000

§ 102(e) Date: Jul. 10, 2000

(87) PCT Pub. No.: WO99/25185

PCT Pub. Date: May 27, 1999

(30) Foreign Application Priority Data

Nov. 17, 1997 (NZ) ............................................. 329190
Feb. 25, 1998 (NZ) ............................................. 329848

(51) Int. Cl.$^7$ ............................................. A01K 61/00
(52) U.S. Cl. ............................................. 119/244
(58) Field of Search ........................................ 119/244

(56) References Cited

U.S. PATENT DOCUMENTS 5,347,951 A    9/1994   Frankboner
5,749,319 A *  5/1998   Hirose ........................ 119/244

FOREIGN PATENT DOCUMENTS

| AU | 60860/69    |   | 3/1971 |            |
|----|-------------|---|--------|------------|
| AU | 8937875 A   | * | 1/1990 |            |
| JP | 405115231 A | * | 5/1993 | A01K/61/00 |
| JP | 406046712 A | * | 2/1994 | A01K/61/00 |
| JP | 6-209673    |   | 8/1994 |            |

\* cited by examiner

Primary Examiner—Charles T. Jordan
Assistant Examiner—Kimberly S Smith
(74) Attorney, Agent, or Firm—Greer, Burns & Crain, Ltd.

(57) ABSTRACT

The invention relates to a nucleus for the production of half or mabe pearls in molluscs. The nucleus comprises a first portion having an external surface adapted to define the shape of the half or mabe pearl to be produced and a second portion which defines a bridge between said first portion and the shell of the host mollusc. The half or mabe pearls so produced have a substantially even cross section of nacre formed over the nucleus, and a generally reduced time is required for the formation of the pearl.

16 Claims, 2 Drawing Sheets

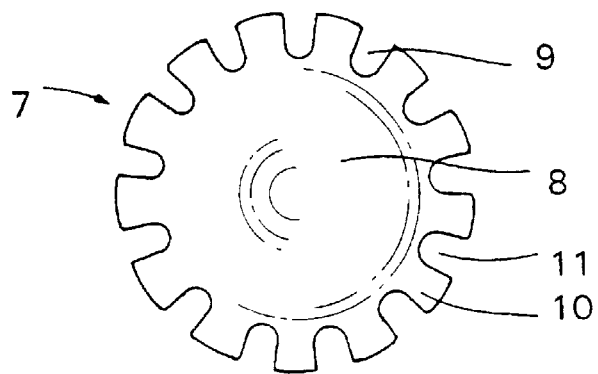
Fig 4
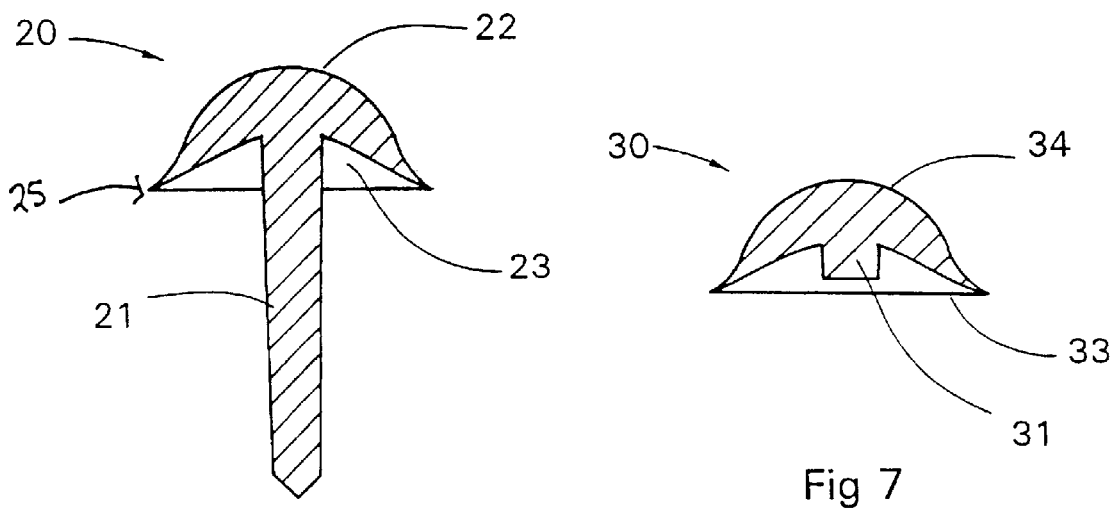
Fig 6
Fig 7
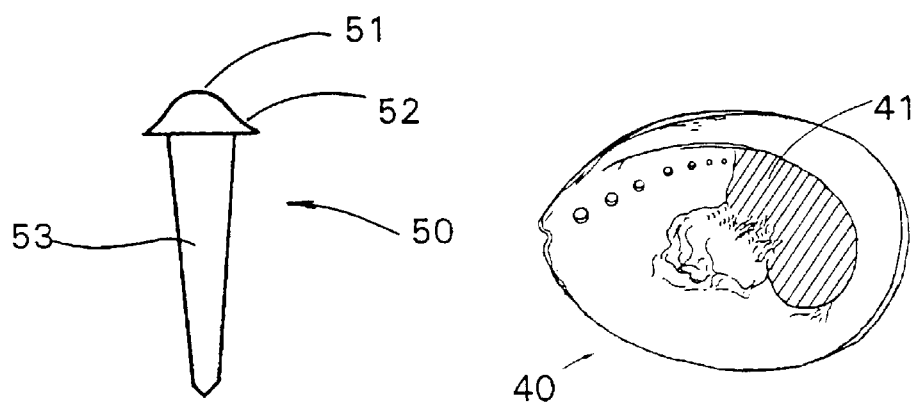
Fig 8
Fig 9

NUCLEUS AND METHOD FOR PRODUCING HALF OR MABE PEARLS

FIELD OF THE INVENTION

This invention relates to the culturing of half or mabe pearls in molluscs. In particular this invention relate s to a nucleus suitable for enhancing the growth of half or mabe pearls in molluscs, and a method for the production of cultured half or mabe pearls.

BACKGROUND

The active production of half or mabe pearls in mollusc s by way of inserting a nucleus, or foreign body, into the tissue of the mollusc, to stimulate the production of calcium carbonate, or nacre, is well known. The nucleus may be implanted into the gonadal tissue of the mollusc, or attached to the shell in such a manner that it directly contacts the mantle tissue of the mollusc. Pearls produced by the artificial introduction of a nucleus are known as "cultured pearls", and "maybe" pearls are produced when the nucleus is attached directly to the shell.

It is also known to vary both the composition and shape of the nucleus in order to obtain some degree of control over the final pearl product. Variations in the composition of the nucleus can result in some control over various factors, such as the colour, texture and hardness of the pearl. Varying the shape of the nucleus can, for example, affect the shape of the resultant pearl, and the time it takes to form.

A large number of techniques have been developed to insert the nucleus into the host mollusc, to try to improve, such factors as the ease of insertion, the mortality of the molluscs and the percentage recovery of pearls.

The time taken from the implantation of the nucleus to the harvesting of a fully developed pearl can be from eighteen months to two or three years, depending on the mollusc and the external conditions. The longer the time, the higher the cost of the pearl production. Furthermore, the risk that the mollusc will not live long enough to complete the process of forming the pearl increases. It is therefore very desirable to reduce the length of time taken from the implantation of the nucleus to the formation of the complete pearl.

In the production of half or mabe pearls in particular, there can also be a problem with achieving an even deposition of nacre over the entire nucleus. The nucleus traditionally used is in the shape of a hemisphere, and there is a problem in that while a substantial thickness of nacre is usually deposited at the base of the nucleus, very often only a thin layer is deposited at the top of the hemisphere. Once the pearl has formed it must be removed from the nucleus, and the hemispherical pearl shell so obtained is then filed with a resin before being mounted into the desired item of jewellery. If the top portion of the half or mabe pearl formed is thin it is prone to breaking, either on removal from the nucleus, or in subsequent use.

There is a need for a method of producing cultured half or mabe pearls which can increase the percentage success of pearl formation within molluscs to which nuclei are inserted, decrease the time taken for a layer of nacre to deposit on the nuclei, and assist in the deposition of a uniformly thick layer of nacre over the whole of the nucleus.

OBJECT

It is an object of the present invention to provide an improved nucleus for the production of half or mabe pearls in molluscs, or to at least provide the public with a useful choice.

STATEMENT OF INVENTION

In a first aspect this invention provides a nucleus for the production of half or mabe pearls in molluscs comprising a first portion having an external surface adapted to define the shape of the half or mabe pearl to be produced and a second portion which defines a bridge between said first portion and the shell of the host mollusc whereby to enhance the development of said half or mabe pearl during production thereof.

Preferably the second portion comprises at least one part of, or all of the primeter of a base of the first portion, and extends outwardly and downwardly from the first portion.

Preferably the said second portion extends continuously around the whole perimeter of the base of the said first portion.

Preferably the said second portion is formed as a concave curved surface extending outwardly and downwardly from the said first portion.

Optionally the said second portion is fringed or perforated in some way.

Preferably both the first and second portions of the nucleus are formed integrally. By integrally is meant that the first and second portions are produced as one single unit or piece.

Preferably the first portion is substantially hemispherical.

In another aspect the invention provides a method of culturing half or mabe pearls in molluscs comprising:

(a) introducing a nucleus comprising a first portion having an external surface adapted to define the shape of the half or mabe pearl to be produced and a second portion which defines a bridge between said first portion and the shell of the host mollusc whereby to enhance the development of said half or mabe pearl during production thereof, into the shell of a host mollusc;

(b) culturing said host mollusc; and (c) harvesting a pearl from said host mollusc.

Preferably the host mollusc is an abalone or paua. Optionally the mollusc is an oyster, mussel, Cook's turbin or cat's eye. However it is envisaged that any mollusc in which a pearl may be cultured is within the scope of this invention.

In yet another aspect the invention provides a half or mabe pearl which has been cultured in a mollusc by inserting into the said mollusc a nucleus comprising a first portion having an external surface adapted to define the shape of the half or mabe pearl to be produced and a second portion which defines a bridge between said first portion and the shell of the host mollusc whereby to enhance the development of said half or mabe pearl during production thereof Preferably the half or mabe pearl so formed is substantially hemispherical in shape. In a most preferred embodiment the half or mabe pearl is either a half ball or a three quarters half ball.

Option ally the half or mabe pearl can take any desired or required shape. Some possible shapes are tear drop, heart, star or oval, but any other shape which may be formed from the nuclei of the invention are envisaged as within the scope of the invention.

In an optional form the nucleus may be formed from a malleable material and with the base of it being slightly concave. The nucleus may then be fixed in place on the shell of the mollusc by applying pressure from above so that it can be squeezed and flattened to allow for vacuum attachment to the shell.

While it is preferred that the first portion is formed in the shape of an hemisphere, it is envisaged as within the scope of the invention that the said first portion may take any other shape in which it is desired to form the half or mabe pearl. If the half or mabe pearl is to be hemispherical it may formed as either a half (a full hemisphere), or three-quarters of a half ball (a full hemisphere with the bottom one quarter removed).

While it is preferred that the first and second portions of the nucleus are formed integrally, that is, in one piece, it is envisaged as within the scope of the invention that the nucleus may be provided in two or more parts which may be subsequently connected, either prior to insertion in the mollusc, or as part of the process of insertion. In particular the said second portion may be formed as a separate skirt or base portion into which the said first portion may be fitted.

It has been found that the nucleus can be adapted most particularly for successful insertion into the mollusc if the said second portion is formed of a reducing cross sectional thickness as it extends outwardly and downwardly from said first portion. The thinner the said second portion is, the better it is able to mold to the variable contours of the shell, and so assist in a more secure positioning of the nucleus.

While the nucleus may be merely pressed on to the shell of the host mollusc it is preferably introduced into the mollusc by any one of three methods. In a first method the nucleus is fitted with a tail, which extends from the central region of the interior of the nucleus. A hole is drilled in the shell of the mollusc, and the tail, preferably tapered at its end, is put through the hole from the inside of the shell, and pulled. The tail is preferably made of a compressable material which can be squeezed through the drilled hole, but expands when the pressure on it is released once the nucleus has been pulled into place against the shell, thus locking in place and holding the nucleus against the inner side of the shell of the mollusc. The excess tail on the outer side of the mollusc can then be snipped off. In a second method the nucleus can be glued to the shell. In this instance the nucleus is preferably formed with a spigot or piece extending down from the central region of the interior of the first part of the nucleus. This section which stops within about 1 mm from the full depth and preferably between 0.25 and 1.25 mm from the full depth, has glue applied to the base of it. It has been found that a fast drying glue, when applied in this way, sets quickly without having to be squeezed flat. In a third preferred method the nucleus is inserted under the internal organs of the mollusc. The nucleus as fitted with the spigot, suitable for gluing in place can be used in this method, or a nucleus without either spigot or tail is suitable. In another option the nucleus with the tail fitted can be adapted for this method, by snipping out the tail. As this nucleus is preferably formed with a cavity under the crown there is easy access for inserting the cutters to remove the tail.

A further advantage of the nucleus of this invention is apparent when this third method is used. With the conventional hemispherical nuclei, used in the past, there have been problems with the repositioning of the internal organs after they have been displaced to facilitate the insertion of the nucleus. It has been known to take several days for them to return to their original position, in which time grit or other matter can settle around the nucleus and interfere with the pearl formation. It appears however, that the bridged second portion of the nucleus of this invention assists the return of the internal organs in that they can ride back up and over the nucleus more easily by way of the bridge. Furthermore, if several nuclei are positioned in one shell, the bridged section appears to prevent the sliding together of the nuclei, which previously was known to occur, preventing the formation of individual pearls.

It has been found that the insert ion of the nucleus of the invention into molluscs results in a significant improval in several other aspects of the half or mabe pearl production.

One improvement noted is in the percentage of recovery of pearls. Commonly, in previous harvests where the nucleus has been of an hemispherical shape, the percentage of pearl recovery has been in the range from 30% to 50%, and the crowns of the pearls formed have often been very thin. It has been found that when the nucleus according to this invention is employed that the percentage recovery of pearls may increase to within the range from 80% to 95%, depending on the skill of the operator.

A further improvement relates to the time taken from implantation of the nucleus to the harvesting of the pearl. In the past, on average the time taken was from about 12 to 18 months in ab alone. When the nucleus of the invention is used it has been found that the time taken may be reduced to about from 8 to 10 months, depending on other factors such as temperature of the water.

It has further been found that the quality of the pearls produced may be significantly improved. When the nucleus of the invention is used the nacre deposits much more evenly over the whole of the said first portion of the nucleus, in particular providing an even coverage over the upper regions of the said first portion.

It is thought that the provision of the bridged second portion of the nucleus assists the mollusc in covering the nucleus with nacre. In the past when the nucleus was an hemisphere only, the base of the nucleus was substantially vertical in relation to the tissue and shell of the mollusc. As the mollusc secreted the nacre and moved it towards the nucleus it was then forced to push the nacre up in a substantially vertical direction to cover the nucleus. It appears that this resulted in the mollusc first having to build an incline, or bridge of nacre to facilitate the elevation of nacre over the upper portions of the nucleus.

The provision of a bridge as part of the nucleus itself has removed the need for this step of the pearl formation to be first completed by the mollusc, and consequently allowed for the improvements noted above. It has also resulted in the formation of half or mabe pearls which have an evenly deposited layer of nacre, rather than those with a thicker portion of nacre formed at the base. Furthermore, it has allowed for the growth of half or mabe pearls having a higher dome than was easily achievable in the past in abalone.

While it is envisaged that each and every manner in which the nucleus of this invention enhances the production of the half or mabe pearl is within the scope of this invention, in particular, as detailed above, the enhancements include the decreased time taken for the formation of the pearls, the even deposition of nacre across the entire nucleus, the ease with which the internal organs of the mollusc reposition themselves over any inserted nucleus and the improved separation of multiple nuclei in any mollusc, enabling each nucleus to develop a separate half or mabe pearl.

It is envisaged as within the scope of the invention that the nucleus may be formed from any materials, known or found to be suitable for the formation of nuclei in the culturing of pearls. Preferred materials include most plastics and glass. Particularly preferred materials include PVC and polypropylene.

EXAMPLES AND DRAWINGS

Some preferred forms of the invention will now be described in more detail, by way of example only, and with reference to the accompanying drawings in which:

FIG. 4 is a top plan view of a nucleus in which the sloped second portion is not continuous about the perimeter of the first shaped portion;

FIG. 6 is a cross-sectional view of a nucleus fitted with a tail for insertion through a drilled hole in the mollusc shell;

FIG. 7 is a cross-sectional view of a nucleus fitted with a post suitable for gluing to the interior of the mollusc shell;

FIG. 8 is a side view of a nucleus of diameter less than 5 mm, with tail attached.

FIG. 9 is a perspective view of an abalone, showing the rear portion and areas suitable for introducing the nuclei under the internal organs, and eliminating the need for drilling.

EXAMPLE 1

Figure 1:
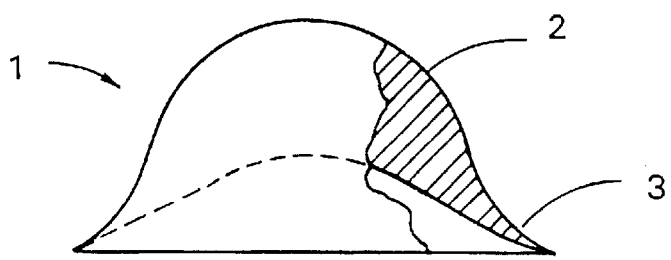
FIG. 1 is a side view of a nucleus according to the invention. The pearl so formed is known as a half ball.
Figure 2:
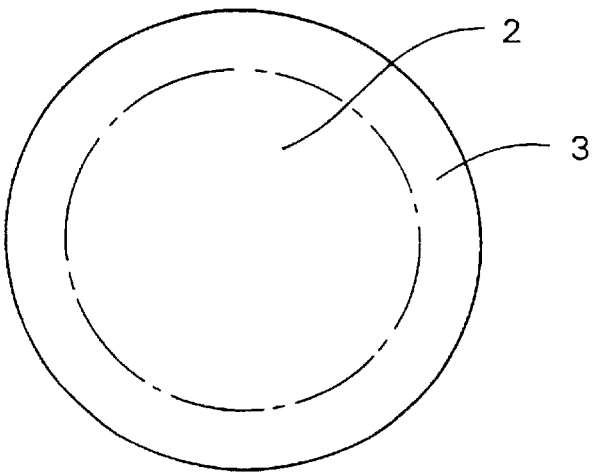
FIG. 2 is a top plan view of the nucleus of FIG. 1.

A nucleus as shown in FIGS. 1 and 2 is inserted into an abalone, 40 (best seen in FIG. 9). The nucleus 1, is comprised of a first shaped portion, 2, in the shape of an hemisphere, and a second bridged portion, 3. The two portions are formed integrally, and the bridged portion curves down and away from the shaped portion, 2. The undersurface of the nucleus is formed in a concave configuration to improve the alignment with the surface of the shell, by pressing the nucleus down against the shell. The abalone is monitored at regular intervals until the pearl is ready for harvesting.

EXAMPLE 2

Figure 3:
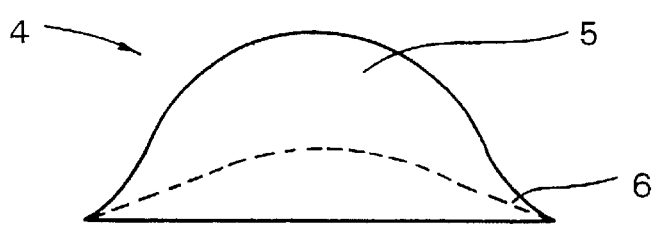
FIG. 3 is a side view of another form of a nucleus according to the invention. The pearl so formed is known as a three quarter half ball.

A nucleus, 4, as shown in FIG. 3 is inserted into an abalone, by the method as described in Example 1. In this case however, the first shaped portion, 5, is in the shape of three quarters of an hemisphere, known as a three quarter ball, and the second portion 6, extends out from the first portion as shown in FIG. 3. The undersurface of the nucleus is shaped in a concave manner. The abalone is monitored until the pearl formed within it is ready for harvesting.

EXAMPLE 3

Figure 5:
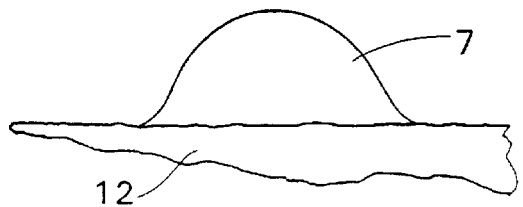
FIG. 5 is a side view of the nucleus placed in situ on the shell of a mollusc.

A nucleus, 7, as shown in FIG. 4 is inserted into an abalone. The first shaped portion, 8, is formed integrally with the second outward and downward extending portion 9. The second portion has been fringed so that a section of it, 10, alternates with a cut out section, 11. The nucleus is inserted in the same manner as in Example 1, and the abalone is similarly monitored until the pearl formed within it is ready for harvesting. FIG. 5 shows the nucleus as placed in situ in the abalone, on the shell, 12.

EXAMPLE 4

The nucleus 20, as shown in FIG. 6, is formed with a tapered tail 21 attached to it. The first portion 22, formed in the shape required for the half or mabe pearl, is hemispherical, and the second portion 25, formed integrally with the first portion, slopes away as a gentle concave curve. A cavity 23, is formed under the nucleus, which both facilitates the closer fitting of the nucleus against the shell, and enables cutters to reach the top of the tail for its removal, should it not be required in the insertion of the nucleus. The tail is formed from a compressible material and is used to introduce the nucleus into the mollusc when a hole has been drilled in the shell. The tail is pulled through the drilled hole from the interior to the exterior, and stretched until the nucleus is seated in place. On releasing the tail the tension is removed, and the compressible material resumes its unstretched diameter and locks in place. The excess tail on the exterior side is then trimmed off. One instance where the tail is not required is when the nucleus is to be inserted into the mollusc under its internal organs, particularly when the mollusc is an abalone. FIG. 9 shows an abalone 40 with the rear internal portion shown as the shaded area 41. This area is the only area which can't be displaced for insertion of the nucleus or nuclei. The introduction of the nucleus under the internal organs of the mollusc means that drilling of the shell is not required. The internal organs are displaced to allow placement of at least one nucleus in this area, and over a period of time they resume their original position. It has been found that the bridge of the nucleus of the invention assists considerably in reducing the time it takes for the organs to resume their original position. Furthermore, if more than one nucleus is placed in the mollusc, the bridge is effective in preventing the nuclei from moving so as to abut each other in such manner that the sides of the first portions are in contact. This ensures the formation of separate pearls from each nucleus.

EXAMPLE 5

The nucleus 30, as shown in FIG. 7, is adapted for fitting to the shell of the host mollusc, by gluing in place. The spigot 31, is of a size such that it finishes between 0.25 mm and 1.25 mm short of the base of the second portion 33. This allows the application of glue to the base of the spigot so that when applied to the shell a neat fit is achieved. The first portion 34, is formed in an hemispherical shape.

EXAMPLE 6

The nucleus 50, shown in FIG. 8, is the design favoured when very small half or mabe pearls are to be cultured. A typical range of diameters for the nucleus is from 2 mm to 5 mm, and in the example shown, the first portion 51, is hemispherical, while the second portion 52, is a gentle concave curve. The nucleus is formed with a tail 53, for insertion into the host mollusc, through a hole drilled in the shell, by the method described in Example 4 above. In the case of this smaller nucleus, no cavity is provided on the under side, as the small size of the nucleus does not permit it. The base of the nucleus may be concave or flat.

The word "comprising" and other forms of the word "comprising" used in this description and in the claims does not limit the invention to exclude any variations or additions which are obvious to the person skilled in the art and which do not have a material effect upon the invention.

Finally it will be appreciated that various alterations and modifications may be made to the foregoing without departing from the spirit or scope of the invention.

What is claimed is:

1. A nucleus for the production of half or mabe pearls in a host mollusc comprising:

a first portion having an external surface adapted to define the shape of the half or mabe pearl to be produced; and a second portion comprising a concave surface for connecting at least a part of the said external surface with an internal surface of the shell of the host mollusc;

the said second portion enhancing the development of said half or mabe pearl during production thereof.

2. A nucleus as claimed in claim 1 having a base side opposed to the said external surface in which a cavity is provided.

3. A nucleus as claimed in claim 1 characterised in that said external surface of said first portion is in the shape of a hemisphere or half ball.

4. A nucleus as claimed in claim 1 characterised in that the said external surface of said first portion is in the shape of a three-quarters hemisphere, or three quarters of a ball.

5. A nucleus as claimed in claim 1 characterised in that the said external surface of said first portion is in a shape selected from: a teardrop, a heart and a star.

6. A nucleus as claimed in claim 1 characterised in that said first portion and said second portion are formed integrally.

7. A mollusc which has contained within it at least one nucleus as claimed in claim 1 for the production of a mabe pearl.

8. A nucleus as claimed in claim 1 characterised in that said nucleus further comprises attachment means for assisting the placement of said nucleus onto the shell of the host mollusc.

9. A nucleus as claimed in claim 8 wherein the said attachment means comprises a spigot extending from a central region of said first portion, ending 0.25 to 1.25 mm short of the full depth of the said nucleus.

10. A nucleus as claimed in claim 8 characterised in that said attachment means comprises a deformable tail extending from a central part of the said cavity.

11. A nucleus as claimed in claim 10 characterised in that the tail is tapered.

12. A method of culturing a mabe pearl comprising:
 (a) introducing a nucleus as claimed in claim 11 into the shell of a host mollusc,
 (b) holding the nucleus against the said host by means of insertion of said deformable tail through a hole in said shell;
 (c) culturing said host mollusc; and
 (d) harvesting a pearl from said host mollusc.

13. A mabe pearl cultured in accordance with the method as claimed in claim 12.

14. A method of culturing a mabe pearl comprising:
 (a) introducing a nucleus as claimed in claim 1 into the shell of a host mollusc;
 (b) culturing said host mollusc; and
 (c) harvesting a pearl from said host mollusc.

15. A method according to claim 14 characterised in that said nucleus is glued to the shell of the said host mollusc.

16. A mabe pearl cultured in accordance with the method as claimed in claim 14.

* * * * *